Oct. 27, 1970 P. K. WEIMER 3,537,071

COUPLING SYSTEM FOR PANEL-TYPE ARRAY

Filed March 23, 1967 5 Sheets-Sheet 1

Inventor:
PAUL K. WEIMER
BY W. H. Sprague
Attorney

Inventor:
PAUL K. WEIMER
BY W. H. Sprouse
Attorney

INVENTOR
PAUL K. WEIMER
BY W. H. Sprouagle
ATTORNEY

Oct. 27, 1970 P. K. WEIMER 3,537,071

COUPLING SYSTEM FOR PANEL-TYPE ARRAY

Filed March 23, 1967 5 Sheets-Sheet 4

INVENTOR
PAUL K. WEIMER

BY W. H. Sprague
ATTORNEY

Oct. 27, 1970 P. K. WEIMER 3,537,071

COUPLING SYSTEM FOR PANEL-TYPE ARRAY

Filed March 23, 1967 5 Sheets-Sheet 5

INVENTOR
PAUL K. WEIMER

BY W. H. Sprouagle
ATTORNEY

United States Patent Office
3,537,071
Patented Oct. 27, 1970

3,537,071
COUPLING SYSTEM FOR PANEL-TYPE ARRAY
Paul K. Weimer, Princeton, N.J., assignor to RCA Corporation, a corporation of Delaware
Filed Mar. 23, 1967, Ser. No. 625,445
Int. Cl. H04q 3/00
U.S. Cl. 340—166 13 Claims

ABSTRACT OF THE DISCLOSURE

A plurality of the discrete elements in a row of the array are concurrently coupled respectively for a predetermined time period to a plurality of storage means associated with respective columns of the array elements and all of the individual storage means are sequentially coupled to external apparatus during said predetermined time period.

In panel-type arrays of a plurality of discrete elements, comprising either image pickup or display apparatus, it is necessary to couple signal information either out of or into the array elements by coupling to external apparatus. When the array elements are addressed individually for relatively short periods of time, it is possible to exchange only a small amount of signal energy between the external apparatus and the elements of the array.

An object of this invention is to provide a coupling system between the elements of a panel-type array and external apparatus which enables the exchange of a materially larger amount of signal energy than heretofore possible.

In accordance with an image sensor or pickup embodiment of the invention, the panel elements are photosensitive and are arranged in rows and columns, all of the elements in each row being connected together and to a vertical scanning system, and all of the elements in each column being connectable to respective signal storage means. A plurality of the elements in a row are coupled concurrently and continuously to their respective column-associated storage means for a predetermined period of time. During a succeeding equal period of time the indivdual column-associated storage means are sequentially coupled to external apparatus, thereby producing video signals representative of the image-derived light at the different photo sensitive panel elements. By such use of the storage means, higher level video signals are produced than are possible by direct individual addressing of the individual panel elements.

In an image display embodiment of the invention in which the panel elements are light emissive or light reflective, for example, the elemental video signals are sequentially coupled to respective column-associated storage means which are subsequently continuously connected, concurrently, to a plurality of the elements in a row of the panel. Thus, the light output from such a plurality of panel elements is increased by the resulting longer excitation thereof.

For a more detailed disclosure of the invention, reference may be had to the following detailed description of the coupling system shown in the accompanying drawings of which:

Figure 1:
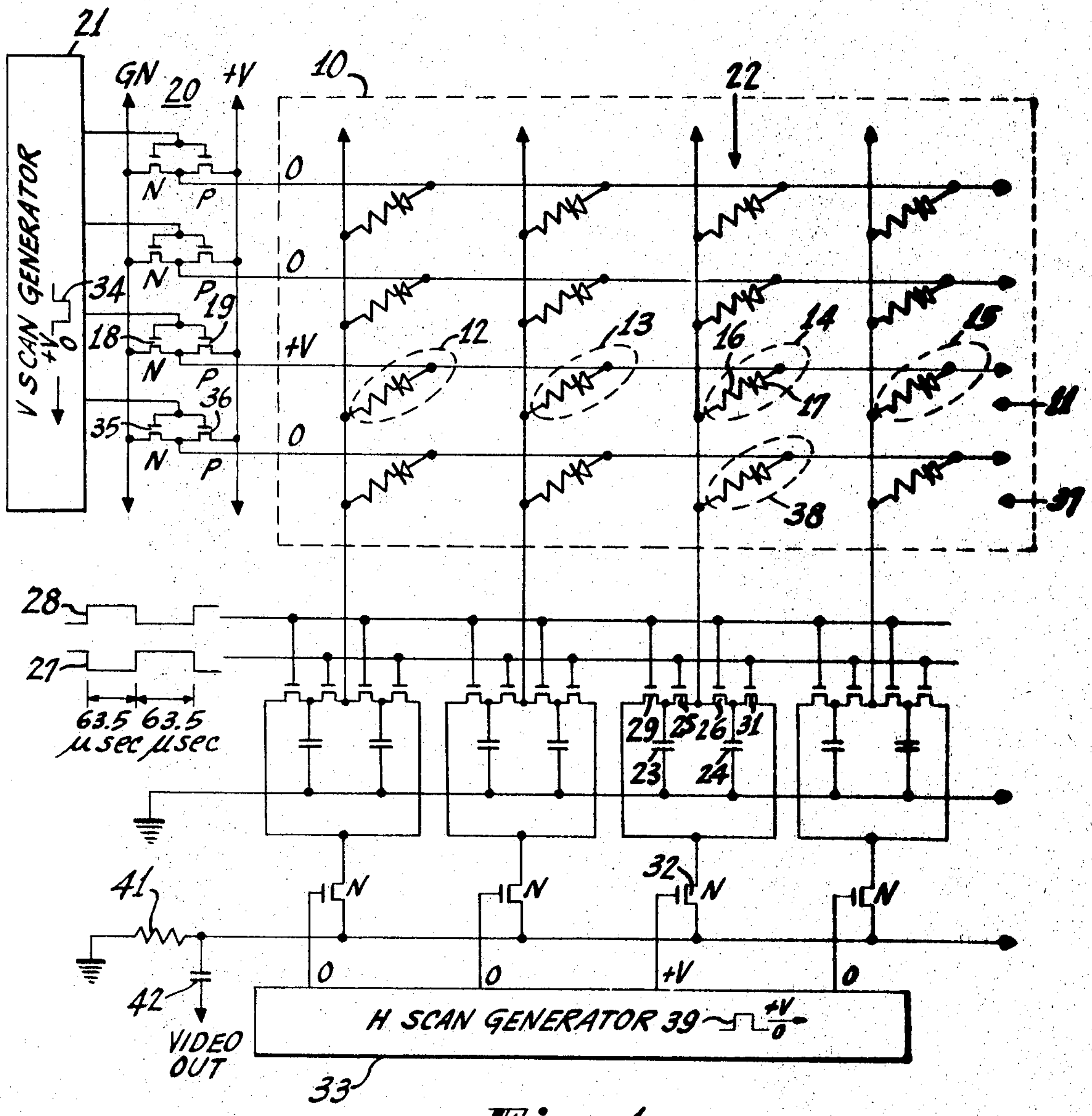
FIG. 1 is a schematic diagram of a portion of an image sensor and one of a coupling system embodying the invention.

In the image sensor array 10 of FIG. 1, the panel elements are photosensitive and are arranged in rows and columns. In row 11, for example, each of the elements 12, 13, 14 and 15 comprises a photoconductor and a diode. These components are represented, for example, in the element 14 by a resistor 16 connected in series with a diode 17. It will be understood that, when suitable connections are made to the panel elements, such as the element 14, current will flow through the photoconductor 16 and the diode 17 in a magnitude determined by the amount of light striking this element of the panel. Each horizontal row of the sensor 10, such as the row 11, is connected to a pair of transistors, such as the transistors 18 and 19 of a line or row switcher 20. These transistors may be of the insulated-gate field-effect variety and are of opposite conductivity. The transistor 18, for example, is an N-type as indicated by the letter "N" and the transistor 19 is a P-type as indicated by the letter "P." The control gates of each pair of transistors, such as 18 and 19, are connected to different points on a vertical scan generator 21 which may be in the form of a clock-controlled shift register which shifts from one row to the next at the rate at which the lines or rows of the array 10 are to be scanned. The scan generator 21 may be of the type shown in Pat. 3,252,009 granted May 17, 1966 to P. K. Weimer.

Each column of elements in the array 10 is associated with individual storage means which for column 22, as an example, comprises capacitors 23 and 24. Signal transfer means are operative to couple all of the elements of one row concurrently to respective column-associated storage means. The signal transfer means for the vertical column 22 of array elements comprises a pair of switching transistors 25 and 26, which may be of the insulated-gate field effect variety. These transistors also are connected respectively, to the storage capacitors 23 and 24. The control gates of the transistors 25 and 26 are connected respectively to sources of impulses 27 and 28. As indicated, these impulses are of opposite phase, each half, cycle of which continues for a period of approximately 63.5 microseconds which is the time required to scan one horizontal line of a television picture according to systems operated under U.S. standards.

The storage means associated with column 22 includes another pair of transistors 29 and 31 which are connected to an elemental selector transistor 32, which may be of the insulated-gate field-effect variety. The control gates of the transistors 29 and 31 are connected, respectively, to the sources of impulses 28 and 27. The control gate of the selector transistor 32 is connected to an output of a clock-controlled horizontal scan generator 33 which may be of the Pat. 3,252,009 type.

In considering the operation of the coupling system of FIG. 1, it should be noted that the row switcher 20 normally connects the elements of the sensor 10 to ground or zero potential, thereby effectively preventing current flow therefrom to the storage means. When it is desired to transfer current from a selected row of panel elements to the storage means, the switcher 20 applies a positive potential to that row of elements. Assume that the elements of row 11 are to be coupled to the storage means. A negative-going pulse 34 of approximately 63.5 microseconds duration is applied from the vertical scan generator 21 to the control gates of the transistors 18 and 19. The transistor 18 is rendered nonconducting, thereby removing the ground connection from the diodes, such as the diode 17, associated with the elements 12, 13, 14 and 15 and the transistor 19 is rendered conducting, thereby applying a positive voltage in place of the previous ground connection.

At the same time, assume that the storage transistors, such as 25, 26, 29 and 31 are N-type transistors and that a positive-going half cycle of the pulse wave 27 is applied to the gate electrodes of the storage transistors 25 and 31, thereby rendering them conductive. Also, at this time a negative half cycle of the pulse wave 28 is applied to the gate electrodes of storage transistors 29 and 26, thereby rendering them nonconductive. A circuit, thus, is established from the positive voltage derived through the transistor 19, through the diode 17 and photoconductor resistor 16, transistor 25 and the storage capacitor 23 to ground. Similar circuits are completed through all of the other elements of the horizontal row 11 to their respective storage capacitors. The photoconductor current is thus selected to flow during an entire line period of approximately 63.5 microseconds from each of the elements in a row of the panel array 10, thereby charging up their associated storage capacitors, such as the capacitor 23.

During the next succeeding line scanning period when the pulse 34 is applied to the switcher transistors 35 and 36 associated with element row 37 of the panel 10, ground again is applied to the elements of panel row 11, thereby effectively discontinuing the charging of storage capacitor 23 and those corresponding to it. Transistor 35 is rendered nonconducting and transistor 36 is rendered conducting, thereby applying positive voltage to the next succeeding row 37 of panel elements including the element 38. During this period of time, however, the pulse waves 27 and 28 are reversed in polarity such that a negative-going half cycle of the pulse wave 27 is applied to the gates of the storage transistors 25 and 21, thereby rendering them nonconductive and a positive-going half cycle of the pulse wave 28 is applied to the gates of storage transistors 26 and 29, rendering them conducting. Photo current flowing in the elements of the succeeding line 37, such as the element 38, for example, then is conducted through transistor 26 to charge the storage capacitor 24. Similarly, all like storage capacitors are charged from associated elements in row 37 of the panel 10.

The circuit from ground through the previously charged storage capacitor 23 is continued through the transistor 29 to the associated selector transistor 32. The circuit at this point, however, is not completed until a positive-going pulse 39 from the horizontal scan generator 33 is impressed upon the control gate of the selector transistor 32. The time duration of such a pulse is small compared to the time duration of any of the pulses 27 and 28 and of those, such as the pulse 34 derived from the vertical scan generator 21. The control pulse 39 from the horizontal scan generator 33 has only an elemental time duration. Thus for N elements in a horizontal row of the sensor array 10, the time duration of one of the horizontal scanning pulses is approximately 63.5/N microseconds. The capacitor 23, thus, is discharged through the transistor 32 and an output load resistor 41 to ground, thereby developing a video signal representative of the light which fell upon the panel element 14. The video signal is coupled by means of a capacitor 42 to a suitable output circuit such as an amplifier for example.

From the foregoing description, it is seen that the storage capacitors corresponding to the capacitors 23 and 24, are alternately charged and discharged on the scanning of successive rows of the sensor array 10, the charging being for a complete line period and the discharging being for an elemental period. In this way, video signals are developed which are materially increased in magnitude and, therefore, are relatively free of distortions produced by noise, switching transients and the like.

All of the components and interconnections therebetween of the apparatus of FIG. 1 may be integrated to produce a completely solid state image sensor of such small size as to be easily susceptible of hand-held operation. Such a necessarily large scale integration of the large number of components required is accomplished by using known silicon technology or by evaporated thin-film techniques.

Figures 2, 3:
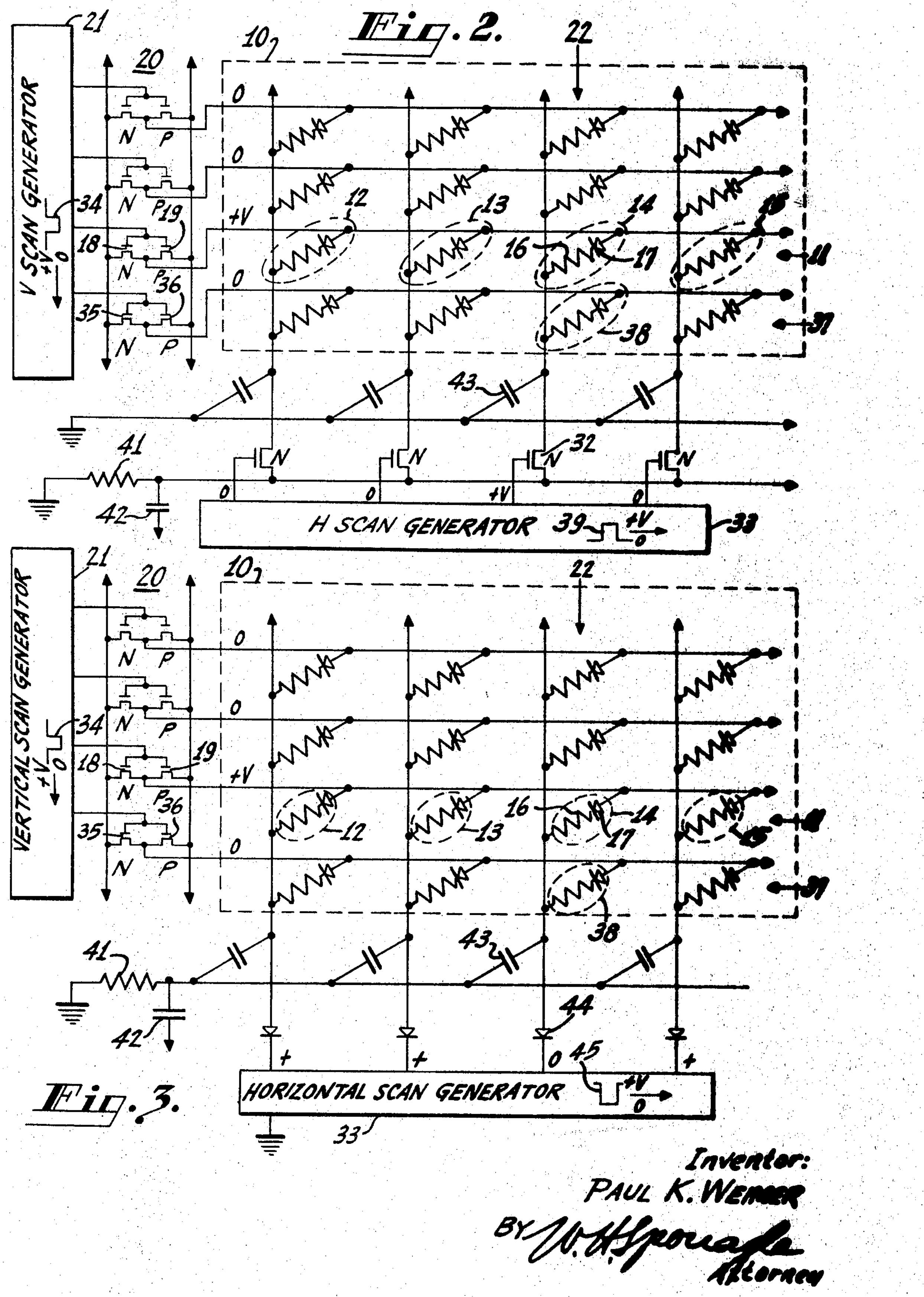
FIG. 2 is a schematic diagram of a simplified form of a coupling system embodying the invention and using triode discharge.
FIG. 3 is a schematic diagram of another simplified form of a coupling system embodying the invention and using diode discharge.

In FIG. 1, seven components are required for each vertical column of the sensor array 10. These components comprise storage capacitors 23 and 24, the switching transistors 25, 26, 29 and 31, and the elemental selector transistor 32. A somewhat simpler coupling system is shown in FIG. 2. In this arrangement a single storage capacitor and an elemental selector transistor is used for each column of the sensor array 10. For example, associated with column 22 of the array, storage capacitor 43 is connected permanently between the elements of the column and ground. When one of the horizontal rows of the array, such as 11, is activated by the switcher transistor 19, as previously described, current is allowed to flow from the element 14 into the associated storage capacitor 43. In like manner, photo current is allowed to flow from all of the other elements of row 11 into the respective column associated storage capacitors such as the capacitor 43. Also, in a manner similar to that described with reference to FIG. 1, the activation of the selector transistor 32 for an elemental period of time causes the discharge of the storage capacitor 43 through the load resistor 41. The other storage capacitors are similarly discharged in sequence.

It will be recognized that, with all of the elements of one line continuously charging their column-associated capacitors, immediately following the discharge of any capacitor by operation of the horizontal scan generator 33, that capacitor will continue to be charged by its associated element in that row until the horizontal scanning of that row is completed. When the next row of panel elements is selected by operation of the switcher 20, such a capacitor will then be charged further by a corresponding element in the next succeeding row. Consequently, the charge on this capacitor will represent a combination of the light falling on two corresponding elements in adjacent lines and a mixed signal will be produced when the capacitor is discharged. In the case that the switcher 20 is operated during horizontal retrace periods, the greatest amount of such signal mixing occurs in the center of the picture while the left and right edges of the picture will exhibit a minimum of signal mixing. In order to minimize such picture degradation at the center thereof the operation of the switcher apparatus 20 may be phased to occur at the center of the picture, at which time the horizontal scan generator 33 is discharging the storage capacitors associated with columns in the center of the sensor array 10.

The sensor array 10 may be provided with an even simpler coupling arrangement, such as that shown in FIG. 3. The only essential difference between FIGS. 2 and 3 is that the selector transistors such as the transistor 32 of FIG. 2, are replaced by diodes, such as the diode 44 associated with column 22 of the array in FIG. 3. This system operates in the same general manner as the system of FIG. 2. In this case, however, with the polarity of the diodes, such as 17 and 44 as shown, the horizontal scan generator 33 produces a negative-going pulse 45 to discharge the column-associated capacitors, such as the capacitor 43 associated with column 22.

Figure 4:
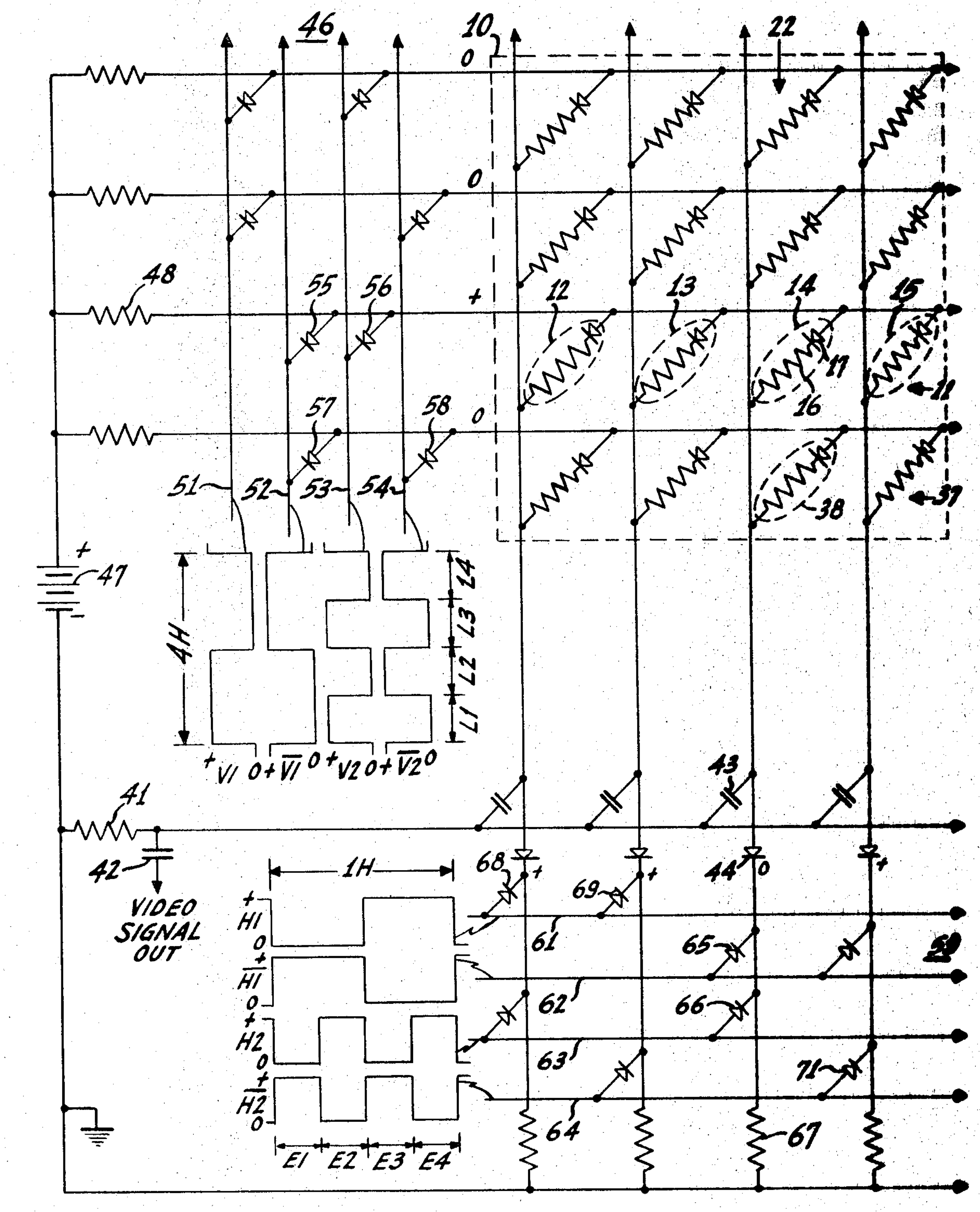
FIG. 4 is a schematic diagram of a coupling system similar to that of FIG. 3 and using a diode decoder scan generator in accordance with a feature of the invention.

FIG. 4 illustrates another embodiment of the invention similar to that of FIG. 3 but using digital types of apparatus for the row-switcher and elemental selector. The switcher 46 includes a resistor connected in series between a grounded source of positive voltage 47 and each horizontal row of the sensor panel 10. For example, resistor 48 is connected to elements 12, 13, 14 and 15 of row 11. The switcher also includes bus bars 51, 52, 53 and 54 to which are connected sources of digital pulses V1, $\overline{V1}$, V2 and $\overline{V2}$ respectively, the pulses V2 and $\overline{V2}$ having twice the frequency of the pulses V1 and $\overline{V1}$. It is to be noted that, in practice, the sensor panel 10 will have more than four horizontal rows of elements, which will require a greater number of bus bars in the switcher 46 and a like number of pulse sources of different frequencies connected thereto. For a panel having $2^N$ rows of elements the switcher has 2N bus bars and sources of pulses having frequencies ranging from $F_V$ to $2^{(N-1)}F_V$.

The switcher 46 functions in the following manner to couple row 11 of the panel 10 to the storage means including the column-associated capacitors, such as capacitor 43 associated with column 22. Pulses $\overline{V1}$ and V2 apply positive voltages to bus bars 52 and 53, respectively, in line period L3, thereby rendering switcher diodes 55 and 56 nonconducting. A positive voltage from the source 47 is applied through the resistor 48 to render conducting all of the diodes of elements 12, 13, 14 and 15. Photo current, thus, flows to charge all of the capacitors, such as the storage capacitor 43. At the same time, all other horizontal rows of the sensor panel 10, such as the row 37 are effectively decoupled from the storage means. This row is controlled by switcher diodes 57 and 58 connected respectively to bus bars 52 and 54. At time L3 when row 11 is coupled to the storage means, pulses $\overline{V1}$ and $\overline{V2}$ apply positive voltage and ground (i.e. zero voltage) respectively to bus bars 52 and 54. Switcher diode 58 is rendered conducting, thereby effectively applying zero voltage to all of the elements in row 37 which prevents these elements from supplying photo current to the storage means.

The elemental selection of the charges stored in the storage means, such as the capacitor 43, to develop video signals is effected by a selector system 59 similar to the row switcher 46. It comprises bus bars 61, 62, 63 and 64 to which are applied digital pulse trains H1, $\overline{H1}$, H2 and $\overline{H2}$ respectively, the pulses H2 and $\overline{H2}$ having twice the frequency of the pulses H1 and $\overline{H2}$. For a panel having $2^M$ elements per row the selector 59 has 2M bus bars and sources of pulses having frequencies ranging from $F_H$ to $2^{(M-1)}F_H$.

During elemental period E3, for example, pulse sources $\overline{H1}$ and H2 apply ground or zero voltages respectively to bus bars 62 and 63, thereby rendering diodes 65 and 66 nonconducting which applies zero voltage to the selector diode 44. The positively charged storage capacitor 43 discharges through the diode 44 and resistors 41 and 67, thereby producing an elemental video signal across resistor 41 which is coupled to an output circuit by the capacitor 42. Also, during elemental time E3, diodes 68, 69 and 71 are rendered conducting by the positive voltages applied to bus bars 61 and 64 respectively by pulse H1 and $\overline{H2}$. The selector diodes associated with panel columns other than column 22, thus are prevented from discharging their associated storage capacitors.

Figure 5:
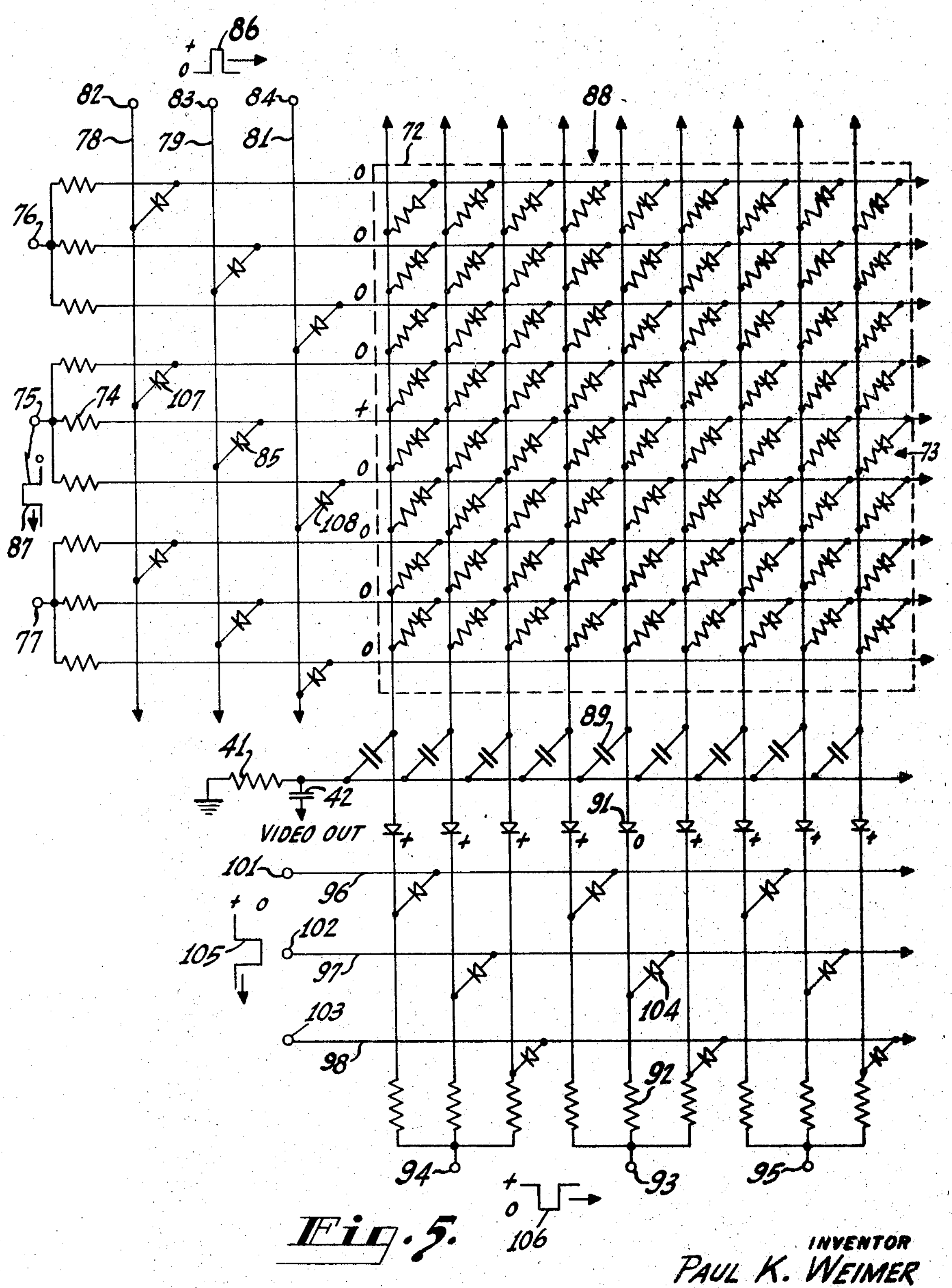
FIG. 5 is a schematic diagram of a coupling system similar to that of FIG. 3 and using another form of diode decoder scan generator in accordance with another feature of the invention.

FIG. 5 illustrates still another embodiment of the invention having features similar to both FIGS. 3 and 4. Row switching and element selection apparatus employs only diodes and uses clock controlled pulses. The panel 72 is shown with the elements arranged in nine rows and nine columns. Each of the rows of elements, such as row 73, is connected through a resistor, such as resistor 74 to a primary switching terminal 75. In the illustrated array of nine rows, three rows are connected through respectively associated resistors to each of three primary switching terminals 75, 76 and 77. In general, for a panel of MN rows there would be M primary switching terminals and N rows connected to each terminal. There also are provided N, in this case three, switching bus bars 78, 79, and 81 connected respectively to N, in this case three, secondary switching terminals 82, 83 and 84. Each of the switching bus bars 76, 77 and 78 is connected by a diode to a row conductor in each of the groups connected to a primary switching terminal. For example, a diode 85 is connected between the bus bar 79 to the conductor of row 73.

A positive-going pulse 86 is applied in sequence to the secondary switching terminals 82, 83 and 84 by a clock-controlled scanning generator (not shown) such as that described in Pat. No. 3,252,009 at the line scanning rate. A positive-going pulse 87 is similarly applied in sequence to the primary switching terminals 76, 75 and 77 at $1/M$ times the line scanning rate.

Each elemental column of the panel 72 is connected to an associated storage capacitor, as for example, column 88 is connected to capacitor 89. Also each column, such as column 88 is connected through a selector diode, such as diode 91, and a resistor, such as resistor 92, to a primary selector terminal 93. As in the previously described row switching apparatus, the columns in the particular panel illustrated are connected in threes through respectively associated diodes and resistors to primary selector terminals 93, 94 and 95. In general, in a panel of PQ elements per row there would be P primary switching terminals and Q columns connected to each primary selector terminal. There also are provided Q, in this case three, selector bus bars 96, 97 and 98 connected respectively to Q, in this case three, secondary selector terminals 101, 102 and 103. Each of the selector bus bars 96, 97 and 98 is connected by a diode to a column conductor in each of the groups connected to a primary selector terminal. Diode 104, for example, connects the bus bar 97 to the conductor of column 88.

A negative-going pulse 105 is applied in sequence to the secondary selector terminals 101, 102 and 103 by a clock-controlled scanning generator (not shown) at the elemental scanning rate. A negative-going pulse 106 is similarly applied in sequence to the primary selector terminals 94, 93 and 95 at $1/Q$ times the elemental scanning rate.

The apparatus of FIG. 5 operates in the following manner. When the pulse 87 is applied to the primary switching terminal 75 and the pulse 86 is applied to the secondary switching terminal 83, the diode 85 is rendered nonconducting, thereby applying the positive voltage of the pulse 87 to the elements of row 73. Photo current then flows through all of the elements of this row into the column-associated storage capacitors, such as the capacitor 89 associated with column 88. At the same time, by virtue of the application of zero voltage or ground to all other secondary switching terminals 76 and 77 all of the elemental rows of the panel connected to these terminals have zero voltage applied thereto, thereby preventing the flow of photo current through the elements. Also at this time diodes 107 and 108 are rendered conducting by the application thereto of the positive voltage of the pulse 87 and the effective grounding of the switching bus bars 78 and 81. Thus, zero voltage is applied to the two other rows of elements connected to the secondary switching terminal 75.

The operation of the selector apparatus by which the storage capacitors, such as the capacitor 89, are discharged sequentially at the elemental scanning rate is similar to the operation of the switching apparatus just described. In general, all of the selector diodes, such as the diode 91, are nonconducting until the negative-going pulses 105 and 106 combine to render the diode 104 conducting which effectively applies zero voltage to the selector diode 91 allowing the storage capacitor 89 to discharge through resistors 41 and 92 to develop a video signal.

Figure 6:
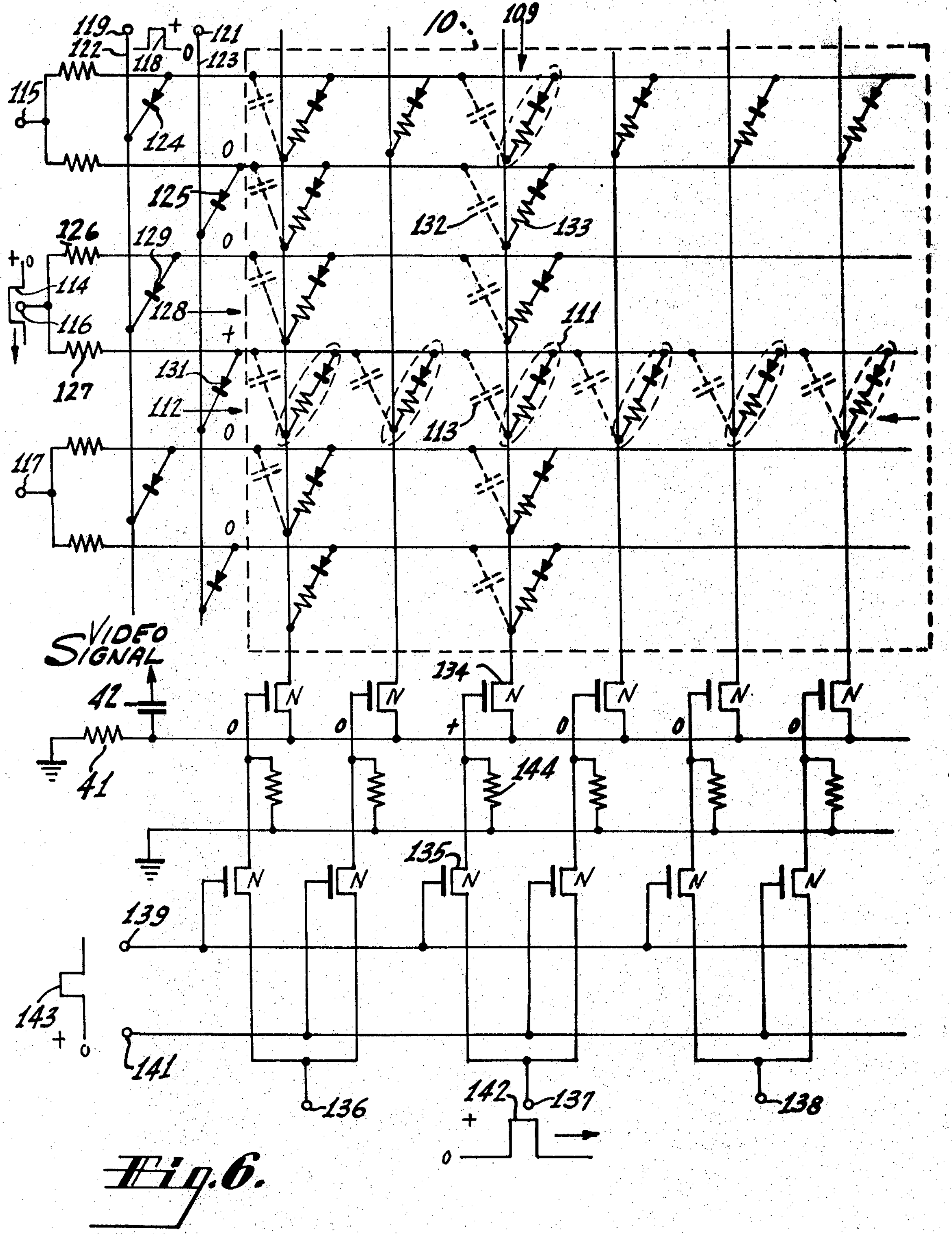
FIG. 6 is a schematic diagram of a coupling system embodying the invention and utilizing inherent capacitance of the panel array as the storage means.

FIG. 6 illustrates a coupling system in accordance with this invention which does not need the addition of separate storage capacitors. In an image sensor panel, the row and column conductors are in the form of metallic strips which overlie one another at their intersections with a layer of intervening insulation. Each intersection therefore represents a small amount of capacitance, the total of which in any column of elements, may be used as the signal storage component for that column. In column 109, of the panel 10, for example, each of the elements such as the element 111 of row 112 has associated therewith an inherent capacitance 113 produced by the intersection of the respective row and column conductors. In a similar manner, all other elements of the panel have comparable capacitances.

The line switching apparatus shown in conjunction with this form of the invention is one which is capable of producing either sequential or interlaced line scanning of the panel array. A positive-going switching pulse 114 is applied at the desired line rate successively to terminals 115, 116 and 117. An auxiliary positive-going switching pulse 118 is applied alternately to terminals 119 and 121. The line switching apparatus also includes diodes connected between their respective row conductors and one or the other bus bars 122 and 123 connected to terminals 119 and 121, respectively.

In describing the operation of the coupling system of FIG. 6, it is to be noted that, in the absence of the impression of the pulse 114 upon one of the terminals such as the terminal 115, the diodes 124 and 125, for example, are nonconducting, thereby applying a zero voltage or ground potential to the associated row conductors. The impression of the positive-going pulse 114 upon terminal 116, for example, applies a positive voltage to resistors 126 and 127 respectively associated with rows 128 and 112. When the positive-going pulse 118 is impressed upon terminal 121 and bus bar 123, the bus bar 122 is at ground potential, thereby rendering diode 129 conductive through resistor 126 which applies a zero voltage or ground potential to the conductor or row 128. The positive potential applied to bus bar 123 renders the diode 131 nonconducting, thereby applying a positive voltage to the conductor or row 112. This causes photo current to flow through each of the elements of row 112 to charge the inherent capacitance of the respective associated columns of the panel array. For example, in column 109, photo current flows from terminal 116 through resistor 127 and element 111 to the inherent capacitances associated with all other elements of the column such as the capacitance 132 associated with element 133. As in previously described embodiments of the invention, the photo current continues to charge the storage capacitance for substantially the whole line period.

The discharge at an elemental rate of the storage capacitance such as represented by the capacitors 113 and 132 of column 109, for example, is effected by sequentially operated transistors such as the N-type insulated-gate field-effect transistors 134. The capacitance discharge is through the load resistor 41 as in other embodiments of the invention. The elemental selectors, such as the selector 134, are actuated in sequence by a scanning generator comprising a series of transistors, such as the N-type insulated-gate field-effect transistor 135. This latter set of transistors is controlled by connections to a primary set of terminals 136, 137 and 138 and to secondary terminals 139 and 141. Such control is effected by a positive-going pulse 142 impressed sequentially upon the primary terminals, such as the terminal 137, at one half of the elemental scanning rate and by a positive-going pulse 143 applied alternately at the elemental scanning rate to the terminals 139 and 141.

When the pulse 142 is applied to the primary terminal 137 and the pulse 143 is applied to the secondary terminal 139, the transistor 135 is rendered conducting to apply a positive voltage to the control gate of the selector transistor 134, thereby completing a circuit from the capacitance of column 109 to the load resistor 141. Resistors, such as the resistor 144, are connected between the control gates of each of the circuit transistors, such as the transistor 134 and ground for the purpose of development of positive voltage for application to the control gates of the selector transistors such as the transistor 134 and for isolation of the switching pulses from the video signal output circuit.

If it is desired to scan the rows of the panel array 10 in a sequential manner, the switching pulse 114 is impressed upon the terminals 115, 116 and 117 at one-half of the line scanning rate and the pulse 118 is alternately applied to the terminals 119 and 120 at the line sequential rate. If, however, it is desired to effect interlaced line scanning of the panel array 10, the pulse 114 is applied successively to terminals 115, 116 and 117 at the line sequential rate and the pulse 118 is alternately applied to the terminals 119 and 121 at the field repetition rate.

The foregoing disclosure of a number of image sensor embodiments of the invention illustrates the manner in which elemental image information is concurrently derived continuously for longer than an elemental period from a plurality of elements of a row and stored for subsequent selection in an elemental sequential manner. In view of such disclosure it will be apparent that the invention also is applicable to image display systems. In a display system the elemental video signals are stored sequentially in the respective column-associated storage means which subsequently are discharge to concurrently and continuously energize for longer than an elemental period a plurality of the light-producing elements of a row, thereby increasing the light output over that obtainable by sequential energization.

What is claimed is:

1. In a panel-type array of a multiplicity of discrete elements arranged in rows and columns, a coupling system for conveying signal information between said elements and external apparatus comprising:

signal storage means including at least one capacitor associated with each of said columns of elements;

signal transfer means for concurrently coupling a plurality of said elements in a row to said respective column-associated storage means for at least a first predetermined time period for transferring signal energy from said plurality of elements to said respective storage means for the entire portion of said predetermined time period; and selector means for coupling said external apparatus sequentially to all of said individual column-associated storage means during a next of said predetermined time periods.

2. A coupling system as defined in claim 1 wherein:

said signal transfer means is operative to concurrently couple all of said elements in a row to said respective column-associated storage means.

3. A coupling system as defined in claim 2 wherein:

each of said storage means includes a pair of first and second capacitors; and said signal transfer means is operative continuously during one time interval to couple all of said first capacitors respectively to the panel elements in one of said rows and to render all of said second capacitors susceptible of being coupled to said external apparatus by said selector means and is operative continuously during the next succeeding and equal time interval to couple all of said second capacitors respectively to the elements in another of said rows and to render all of said first capacitors susceptible of being coupled to said external apparatus by said selector means.

4. A coupling system as defined in claim 1 wherein:

said signal storage means comprises a single capacitor associated with each of said columns of panel elements.

5. In a panel-type array of a multiplicity of discrete elements arranged in rows and colums, a coupling system for conveying signal information between said elements and external apparatus comprising:

signal storage means including a pair of first and second capacitors associated with each of said columns of elements;

signal transfer means including first and second transistors, each having input, output and control electrodes, for each one of said pairs of storage capacitors for concurrently coupling all of said elements in a row to respective ones of said column associated first and second capacitors for at least a first predetermined time period;

selector means for coupling said external apparatus sequentially to all of said individual column-associated storage means during a next of said predetermined time periods;

said signal transfer means being operative continuously during one time interval to couple all of said first capacitors respectively to the panel elements in one of said rows and to render all of said second capacitors susceptible of being coupled to said external apparatus by said selector means and being operative continuously during the next succeeding and equal time interval to couple all of said second capacitors respectively to the elements in another of said rows and to render all of said first capacitors susceptible of being coupled to said external apparatus by said selector means;

means connecting the respective input and output elecelectrodes of said first transistors in circuit between the repective storage capacitors of each one of said pairs of capacitors and said respective columns of panel elements;

means connecting the respective input and output electrodes of said second transistors in circuit between the respective storage capacitors of each one of said pairs of capacitors and said selector means; and means for simultaneously operatively energizing continuously during said one time interval the control electrodes of said first transistors connected to said first capacitors and the control electrodes of said second transistors connected to said second capacitors and for simulatneously operatively energizing continuously during said next succeeding and equal time interval the control electrodes of said first transistors connected to said second capacitors and the control electrodes of said second transistors connected to said first capacitors.

6. A coupling system as defined in claim 5 wherein:

said selector means includes a transistor having input, output and control electrodes for each of said pairs of storage capacitors;

means connecting the respective input and output electrodes of each of said selector transistors in series between said external apparatus and said associated input-output electrode circuits of said second transfer transistors; and means for operatively energizing the control electrodes of all of said selector transistors sequentially during each of said successive time intervals.

7. A coupling system as defined in claim 4 wherein:

said single storage capacitors are permanently connected to their respective associated columns of panel elements; and said signal transfer means is operative to concurrently couple all of said panel elements in at least one row of elements to said respective column-associated storage capacitors for a period of time equal to that required for said selector means to sequentially couple all of said storage capacitors to said external apparatus.

8. A coupling system as defined in claim 7 wherein:

said signal transfer means is operative to shift from coupling said storage capacitors from one to another row of said panel elements at a time occurring between the times at which said selector means couples said external apparatus to the capacitors associated, respectively with a column of said panel elements intermediate the columns of panel elements at the sides of said array.

9. A coupling system as defined in claim 7 wherein:

said signal transfer means is operative to shift from coupling said storage capacitors from one to another row of said panel elements at at time approximately coinciding with the time at which said selector means couples said external apparatus to the capacitor associated with the center column of said panel elements.

10. A coupling system as defined in claim 7 wherein:

said signal transfer means is operative to shift from coupling said storage capacitors from one to another row of said panel elements at a time occurring after said selector means couples said external apparatus to the capacitor associated with the last one of one row of said panel elements and before said selector means couples said external apparatus to the capacitor associated with the first one of another row of said panel elements.

11. A coupling system as defined in claim 7 wherein:

said selector means includes a triode having input, output and control electrodes for each of said storage capacitors;

means connecting the respective input and output electrodes of each of said selector triodes in series between said external apparatus and said respective column-associated storage capacitors; and means for operatively energizing the control electrodes of all of said selector triodes sequentially during said predetermined time period.

12. A coupling system as defined in claim 11 wherein:

each of said selector triodes is a transistor.

13. A coupling system as defined in claim 7 wherein:

said selector means includes a diode for each of said storage capacitors;

means connecting each of said selector diodes in series between said external apparatus and said respective column-associated storage capacitors; and means for operatively rendering all of said selector diodes sequentially conductive during said predetermined time period.

References Cited

UNITED STATES PATENTS

| | | | |
|---|---|---|---|
| 2,967,265 | 1/1961 | Diemer et al. | |
| 3,416,143 | 12/1968 | Van Goethem et al. | 340—166 |
| 3,435,138 | 3/1969 | Borkan | 340—166 |

THOMAS A. ROBINSON, Primary Examiner

U.S. Cl. X.R.

307—294; 340—173